Patented Jan. 28, 1947

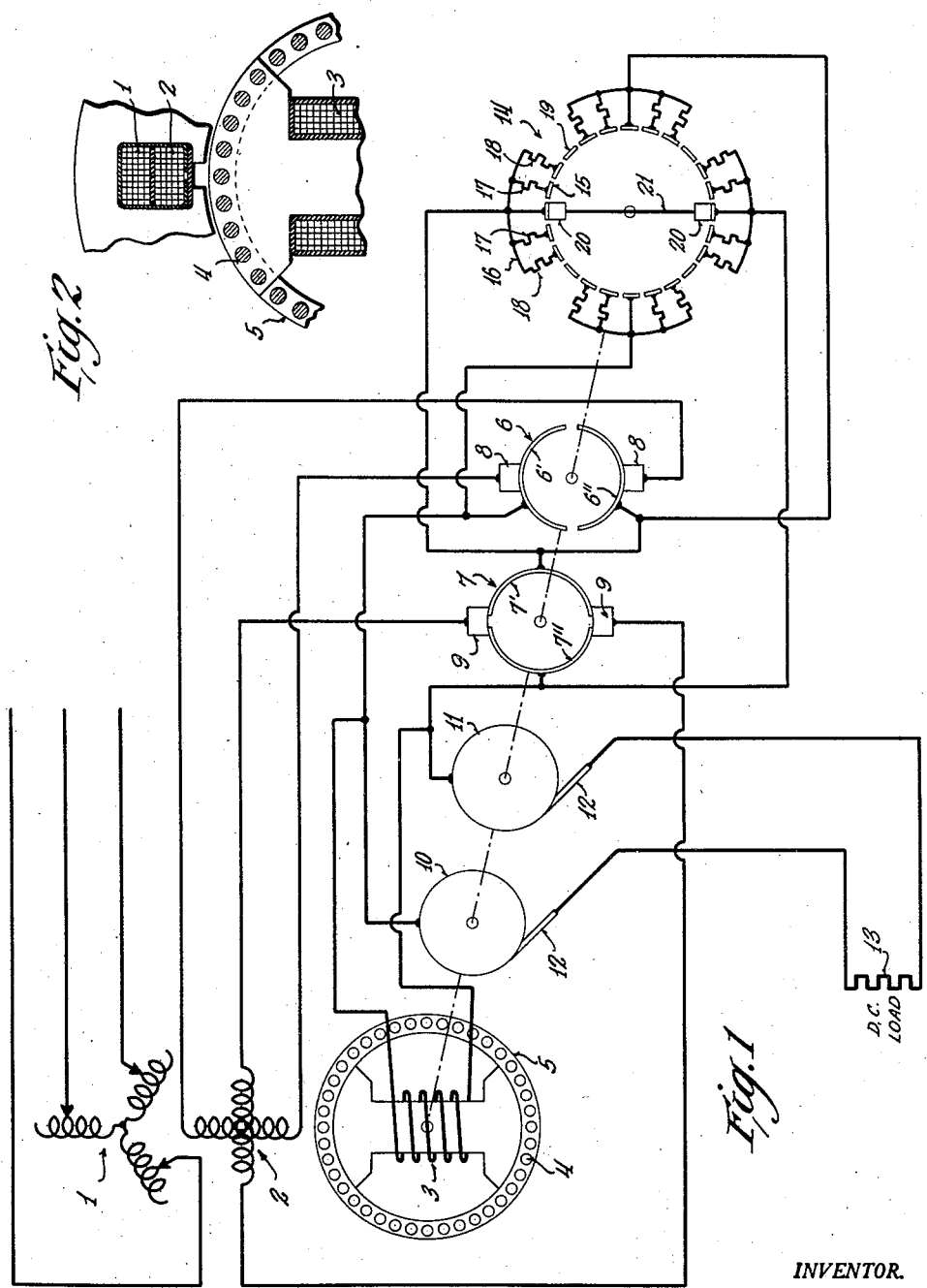

2,415,007

UNITED STATES PATENT OFFICE 2,415,007

RECTIFIER AND TRANSFORMER UNIT

Klaus L. Hansen, Milwaukee, Wis.

Application August 21, 1944, Serial No. 550,429

12 Claims. (Cl. 172—280)

This invention relates to a rectifier and transformer unit.

Objects of this invention are to provide a combined transformer and synchronous rectifier which is so made that the device has two main elements constituting a rotor and a stator respectively, one of the elements being a transformer element and having polyphase primary and secondary windings, and the other main element having a direct current winding and a short-circuited winding, the element which constitutes the rotor driving the commutating means for rectifying the alternating current from the secondary windings of the transformer unit for supplying direct current to a work circuit and to the direct current winding.

In rectification harmonics are usually produced due to the fact that the rectifier is often required to interrupt the alternating current at points different from the zero points. These harmonics, if no provision were made to take care of them, would be reflected back from the secondary through the primary out on the line and would give trouble, particularly if the line were a high impedance line, as they would cause a loss of energy and would be radiated from the line thus producing interference with communication systems.

Further objects are to provide, in a device of the above defined type, a short-circuited tertiary winding closely interlinked with the secondary winding of the transformer and rotated synchronously with the fundamental frequency for which the device is designed.

It has been found that the short-circuited tertiary winding, which is closely interlinked with the secondary winding through which the harmonics pass, offers a low impedance path for the harmonics and produces a magnetic flux in opposition to that produced by the harmonics and prevents generation of high voltage due to the harmonics and prevents reflection of the harmonics back through the transformer unit onto the line and prevents any material waste of energy due to the harmonics. In addition to this it has been found that commutation is also greatly improved.

Further objects of this invention are, therefore, to provide a combined synchronous rectifier and transformer unit which is so made that harmonics generated due to the action of the rectifier find a low impedance path through the secondary windings due to the coaction of the short-circuited tertiary winding with the secondary windings of the transformer and are, therefore, prevented from being sent out on the line, and to so arrange the tertiary circuit that it is rotated in synchronism with the fundamental frequency and does not waste any energy due to the fundamental frequency.

Further objects are to provide a combined polyphase synchronous rectifier and transformer which is so made that rectification takes place for each phase and the output from all of the phases is added to provide direct current for the load circuit, in which, when the current flow is reversed with reference to any given secondary, a by-pass circuit is formed around such secondary to prevent an instantaneous dip or dropping of rectified current due to the reactance of such secondary, the arrangement being such that no secondary acts as a choke in the output circuit.

In greater detail, further objects are to provide a combined polyphase synchronous rectifier and transformer which is so made that during the period of rectification for any given phase a variable resistance is inserted in the by-pass circuit around the secondary just prior to the instant of rectification, in which this resistance is decreased to an approximate zero value at the instant of rectification and is again inserted in the by-pass circuit just after rectification, and in which the by-pass circuit is either finally opened or else its resistance very greatly increased, the complete opening of the by-pass circuit at this instant being the preferred construction.

Further objects are to provide a device of the above outlined character which may also be used, if desired, to change direct current to alternating current, or which may be used as a direct current motor driving a mechanical load in which case the primary would either be left open or wholly omitted.

Further general objects of this invention are to improve commutation.

Further objects are to provide a synchronous rectifier which is efficient, which is self-starting, and which, though having the desirable characteristics set forth above, is of simple construction.

An embodiment of the invention is shown in the accompanying drawing, in which:

Figure 1 is a schematic view showing the combined transformer unit and synchronous rectifier unit.

Figure 2 is a fragmentary view, partly broken away, showing a portion of the stator and rotor with one of the end rings sectioned off.

The device comprises a synchronous motor structure in which the two main elements constituting the stator and the rotor are arranged to respectively provide a transformer unit having primary and secondary windings and a second unit having a direct current winding and a short-circuited winding. The invention has been shown with the transformer unit forming the stator unit and the direct current and short-circuited windings carried by the rotor unit, though this arrangement, of course, could be reversed.

Referring to the drawing, it will be seen that the stator is provided with a polyphase primary winding indicated by the reference character 1, which may be a three phase winding provided with taps. A polyphase secondary winding 2 is provided. For simplicity it may be a two phase winding as shown.

The rotor is provided with a direct current winding 3 which is adapted to produce the poles of the rotor. The rotor carries a short-circuited winding which may be in the form of a squirrel cage, the bars being indicated by the reference character 4 and the end rings by the reference character 5. This short-circuited winding constitutes a tertiary winding which, as will be seen as the description proceeds, insures a low impedance path for harmonics, prevents their reflection out onto the line, prevents any material energy loss due to such harmonics and does not absorb energy at the fundamental frequency for which the device is designed and operated. In the schematic showing in the drawing the rotor has been shown as a two-pole rotor, though, of course, the stator and rotor could be formed so as to provide four poles or any number of poles desired, corresponding changes being made in the number of commutation segments and brushes in the rectifier portion of the apparatus. The rotor shaft also carries two rectifying commutators indicated generally by the reference characters 6 and 7 each having a pair of segments, indicated at 6' and 6" and 7' and 7", respectively. These segments are arranged at right angles to each other. A pair of brushes 8 bear upon the commutator 6 and are connected to opposite sides of one of the two phase secondary windings 2. Similarly a pair of brushes 9 bear on the commutator 7 and are connected to opposite ends of the other of the two phase secondary windings 2. The segments 7' and 6" are directly electrically connected. The rotor shaft also carries a pair of slip rings 10 and 11 which are connected respectively to the segments 6' and 7". Brushes 12 bear on the slip rings and are connected to the direct current load circuit 13.

It is preferable to have the short-circuited winding consisting of the bars 4 and the end rings 5 closely coupled with the secondary 2. This is readily accomplished by winding the primary windings 1 in the outer portions of slots in the stator and winding the secondary windings 2 in the inner portions of the slots of the stator. Obviously the primary and secondary windings may be distributed windings or may be formed in any other way desired and may be of the same or of a different number of phases.

By shifting the taps on the primary 1 any desired voltage may be obtained at the brushes 12 for the direct current load circuit.

It is to be noted particularly that the commutators 6 and 7 are connected in series with each other and in series with the direct current winding 3 and consequently furnish direct current to the direct current winding without the necessity of slip rings. Slip rings are employed, however, in order to lead direct current from the rectifier to the load circuit.

It is to be noted that there is a very close interlinking of the secondary winding 2 and the short-circuited tertiary winding of the rotor. Consequently harmonics produced by the synchronous rectifier will be prevented from being transmitted back out onto the line as the short-circuited winding or tertiary winding causes a low impedance path to be offered to these harmonics and at the same time since the short-circuited winding rotates synchronously with reference to the fundamental frequency for which the device is designed, it is apparent that the short-circuited winding will absorb no energy due to that transmitted at the fundamental frequency.

It is to be noted that although the transformer unit has been shown as a portion of the synchronous motor unit that nevertheless the transformer unit could be an entirely separate unit and the synchronous motor unit could be a distinct and separate unit. In this case the short-circuited tertiary winding could be used or could be omitted as desired but would have no effect on commutation. However, the form shown is the preferred form of the invention. Both the short-circuited tertiary winding and the commutating bridging means hereinafter described in detail coact to improve commutation. It is, of course, within the province of this invention, even in the preferred form, to omit the short-circuited tertiary winding. In this case the entire reliance for excellent commutation would be placed on the short-circuited commutating means.

The preferred form of construction has been illustrated in that the stator is preferably the transformer unit and the rotor preferably carries the short-circuited winding and the direct current winding, though, as stated, these two main units could be reversed.

The rectifier may not interrupt the circuit at exactly the zero point and consequently there is a very pronounced tendency to produce harmonics differing, of course, from the fundamental frequency, but inasmuch as this invention provides means whereby a low impedance path is furnished such harmonics, obviously such harmonics do not waste any material portion of the energy supplied the machine and also are not reflected back out onto the line. It is believed that the above points will be better understood when it is considered that at the instant the commutator 7 is commutating, it is also reversing the current flow through its corresponding secondary coil, and, similarly, when the commutator 6 is commutating, it is also reversing the current flow through its corresponding secondary coil. It is clear that by providing the short-circuited tertiary winding, this reversal of current is greatly facilitated and commutation is very much improved.

This invention provides means whereby the reversal of current through a particular secondary winding of the transformer does not have to suddenly occur. Instead, this invention provides a by-pass short-circuiting path around that parcular secondary at the instant of commutation for such secondary and into this path a variable resistance is interposed just prior to commutation, is reduced to an approximate zero value at the instant of commutation, and is increased just after commutation until that particular secondary is in condition, due to its normal transformer action, to take its share of the load. This arrangement thus prevents any secondary winding from acting as a choke in the load circuit, the arrangement being such, as will be seen as the description proceeds, that the inserted resistance is confined to the by-pass path and does not increase the resistance in the load circuit as it is in parallel with that particular secondary during commutation.

The immediately above described desirable features are accomplished by adding the commutator indicated generally at 14 to the shaft driven from the rotor. This commutator comprises a plurality of segments 15 which are arranged in four groups with all of the segments of a group connected to a common conductor 16. The centrally located segment of a group is directly connected to the conductor 16. The next adjacent segments on each side thereof are connected to the conductor 16 by small value, high current capacity resistors 17 and the next adjacent segments on each side are connected to the conductor 16 by resistors 18 of higher resistance than the resistors 17 and of high current capacity.

Any number of gradually increasing resistors can be employed. Preferably an idle segment 19 is interposed between each group of segments, though, of course, it is within the province of this invention to connect one group of segments to a succeeding group of segments by a relatively high resistor if so desired. The conductors 16 are connected in a regular order to the segments 6', 6'' of the commutator 6 and 7', 7'' of the commutator 7. Short-circuiting brushes 20 are directly connected by means of the conductor 21 and bear on diametrically opposed groups of the segments, it being noted that the diametrically opposed groups of the segments for a two-pole rotor as indicated are connected to the segments of the same rectifying commutator, for instance the commutator 6, and those at right angles thereto are connected to the segments of the other rectifying commutator, for instance the commutator 7.

At the instant that the parts are in the position shown in Figure 1, it is apparent that one phase of the secondary windings 2 is supplying load current while the other secondary is passing through its zero point and commutation is taking place just at the instant that the reversal of current flow in such other secondary winding is about to take place. In order to prevent any choking action of the secondary winding then being commutated, a direct short-circuit path or by-pass path is formed around such secondary winding and the load current flows through this short-circuiting by-pass path, thus preventing the reactance of the secondary winding then being commutated from adversely affecting the load circuit.

As the commutator 14 rotates, a relatively small value, high capacity resistor is inserted into this by-pass circuit and the resistance of the by-pass circuit is gradually and automatically built up until finally it arrives at an infinite value as such by-pass circuit is opened in the form of the invention shown, thus allowing the last mentioned secondary winding to assume its share of the load. The output rectified current, therefore, never drops to zero. It is also to be noted that just prior to rectification for any secondary resistances of succeedingly decreasing values are inserted in the by-pass circuit to thus provide a by-pass circuit for the decreasing current flow taking place in that particular secondary due to the normal transformer action.

In addition to this, the tertiary circuit, namely, the short-circuited bars on the rotor, prevents the reflection of any harmonics back out onto the line.

It is to be understood that the device can be operated to convert direct current into alternating current by supplying direct current to the brushes 12. Also the device can be run as a direct current motor in which the primary would either be left open or wholly omitted.

When the apparatus is run in its normal condition as a rectifier as hereinabove described in detail, it is to be noted that the amount of energy required by the synchronous motor is relatively small in proportion to the amount of energy which is transmitted to the direct current load circuit and consequently the efficiency of the apparatus is high.

It will be seen also that in view of the fact that a rotating field is produced, the device constitutes a self-starting synchronous rectifier.

It will be seen further that this invention provides a combined synchronous rectifier and transformer unit which does not waste any material amount of energy due to harmonics and prevents the harmonics from being reflected back onto the supply line and prevents the secondary windings from acting as chokes during commutation when the current flow therethrough is reversed and which supplies a load circuit with an average value of rectified current without allowing the rectified current to drop to zero value at any portion of the commutation cycle.

It is within the province of this invention to provide a construction in which a single phase primary was used and a polyphase secondary in the transformer element of the unit, provided some means were furnished for starting the motor initially. Under these conditions the motor would run as a synchronous motor and polyphase current would be generated in the secondary of the transformer element and rectification would take place as hereinabove described.

Although this invention has been described in considerable detail, it is to be understood that such description is intended as illustrative rather than limiting, as the invention may be variously embodied and is to be interpreted as claimed.

I claim:

1. A synchronous rectifier and transformer unit comprising a pair of elements, said elements constituting a stator and a rotor respectively, one of said elements being a polyphase transformer element and having a plurality of primary and secondary windings, the other of said elements having a direct current winding, a load circuit, and synchronous commutating means driven from said rotor and electrically connected between said secondary windings and said load circuit and direct current winding, and synchronous commutating means driven from said rotor for sequentially establishing a by-pass circuit around each secondary winding during commutation for such winding.

2. A synchronous rectifier and transformer unit comprising a pair of elements, said elements constituting a stator and a rotor respectively, one of said elements being a polyphase transformer element and having a plurality of primary and secondary windings, the other of said elements having a short-circuited winding and a direct current winding, a load circuit, and synchronous commutating means driven from said rotor and electrically connected between said secondary windings and said load circuit and direct current winding, and synchronous commutating means driven from said rotor for sequentially establishing a by-pass circuit around each secondary winding during commutation for such winding.

3. A commutating and transformer unit comprising a pair of elements, said elements constituting a stator and a rotor respectively, one of said elements being a polyphase transformer element and having a plurality of primary and secondary windings, a load circuit, commutating means for each secondary winding driven from said rotor and electrically connected between the corresponding secondary winding and the load circuit, and means for establishing a by-pass circuit around each secondary winding during the commutation period for such winding.

4. A commutating and transformer unit comprising a pair of elements, said elements constituting a stator and a rotor respectively, one of said elements being a polyphase transformer element and having a plurality of primary and secondary windings, a load circuit, commutating means for each secondary winding driven from said rotor and electrically connected between the corresponding secondary winding and the load circuit, and commutating means driven from said rotor for establishing a by-pass circuit around each secondary winding during the commutation period for such winding.

5. A commutating and transformer unit comprising a pair of elements, said elements constituting a stator and a rotor respectively, one of said elements being a polyphase transformer element and having a plurality of primary and secondary windings, a load circuit, commutating means for each secondary winding driven from said rotor and electrically connected between the corresponding secondary winding and the load circuit, and commutating means driven from said rotor for establishing a by-pass circuit around each secondary winding during the commutation period for such winding, said last mentioned commutating means including means for varying the resistance of said by-pass circuit from a predetermined value just prior to commutation, to approximately zero value at the instant of commutation, and increasing the resistance to a predetermined value just after commutation.

6. A commutating and transformer unit comprising a pair of elements, said elements constituting a stator and a rotor respectively, one of said elements being a polyphase transformer element and having a plurality of primary and secondary windings, a load circuit, commutating means for each secondary winding driven from said rotor and electrically connected between the corresponding secondary winding and the load circuit, and commutating means driven from said rotor for establishing a by-pass circuit around each secondary winding during the commutation period for such winding, said last mentioned commutating means including means for varying the resistance of said by-pass circuit from a predetermined value just prior to commutation, to approximately zero value at the instant of commutation, and increasing the resistance to a predetermined value just after commutation, and thereafter interrupting said by-pass circuit.

7. A synchronous rectifier and transformer unit comprising a stator and a rotor, said stator being a polyphase transformer element and having a plurality of primary and secondary windings, said rotor having a short-circuited winding and a direct current winding, a load circuit, a plurality of commutators driven from said rotor and electrically connected to said load circuit and to said direct current winding, brushes connected to said secondary windings and bearing on said commutators, and means for establishing a by-pass circuit around each of said secondary windings during commutation with respect to such secondary.

8. A synchronous rectifier and transformer unit comprising a stator and a rotor, said stator being a polyphase transformer element and having a plurality of primary and secondary windings, said rotor having a short-circuited winding and a direct current winding, a load circuit, a plurality of commutators driven from said rotor and connected in series with each other and electrically connected to said load circuit and to said direct current winding, brushes connected to said secondary windings and bearing on said commutators, and means for establishing a by-pass circuit around each of said secondary windings during commutation with respect to such secondary.

9. A synchronous rectifier and transformer unit comprising a stator constituting a transformer element and having a polyphase primary and a polyphase secondary winding, a rotor having a short-circuited winding and a direct current winding, a load circuit, a plurality of commutators driven from said rotor, brushes connected to said secondary winding and bearing on said commutators, said commutators and said direct current winding being all connected in series, slip rings driven from said rotor and connected to said commutators, means driven from said rotor for establishing a by-pass circuit around each of said secondary windings during commutation with respect to such secondary, and brushes connected to said load circuit and bearing on said slip rings, said commutators, slip rings and load circuit being all connected in series.

10. A synchronous rectifier and transformer unit comprising a pair of elements, said elements constituting a stator and a rotor respectively, one of said elements being a transformer element and having a primary winding and polyphase secondary windings, the other of said elements having a direct current winding, a load circuit, and synchronous commutating means driven from said rotor and electrically connected between said secondary windings and said load circuit and direct current winding, and synchronous commutating means driven from said rotor for sequentially establishing a by-pass circuit around each secondary winding during commutation for such winding.

11. In a system of rectification, a transformer means for supplying polyphase current, said transformer means having secondary windings, a synchronous rectifier unit including a synchronously rotating rotor, a load circuit, synchronous commutating means driven from said rotor and electrically connected between the secondary windings of said transformer means and said load circuit, and synchronous commutating means driven from said rotor for sequentially establishing a by-pass circuit around each secondary winding during commutation for such winding.

12. A commutating and transformer unit comprising a stator having primary and secondary windings bearing a polyphase relation to each other, a rotor having a short circuited winding, a plurality of slip rings driven from said rotor, brushes bearing on said slip rings, a plurality of commutators driven from said rotor and connected in series between said slip rings, brushes bearing on said commutators and connected to said secondary windings, and means for establishing a by-pass circuit around each of said secondary windings during commutation with respect to such secondary winding.

KLAUS L. HANSEN.